United States Patent
Kurukchi et al.

[11] Patent Number: 5,885,422
[45] Date of Patent: Mar. 23, 1999

[54] SPENT CAUSTIC (PRE)TREATMENT PROCESS

[75] Inventors: Sabah A. Kurukchi, Houston; Joseph M. Gondolfe, Cypress, both of Tex.

[73] Assignee: Stone & Webster Engineering Corporation, Boston, Mass.

[21] Appl. No.: 807,873

[22] Filed: Feb. 26, 1997

[51] Int. Cl.⁶ .............................. B01D 3/38; B01D 11/04
[52] U.S. Cl. ................... 203/45; 203/46; 203/75; 203/76; 203/78; 203/79; 208/317; 208/321; 208/337; 208/356; 208/363; 423/183; 423/641
[58] Field of Search ................... 203/45, 46, 43, 203/44, 96, 92, 75, 76, 78, 79; 208/321, 337, 317, 364, 347, 339, 322, 311, 363, 356; 423/641, 181, 182, 183; 210/639, 774

[56] References Cited

U.S. PATENT DOCUMENTS

| | | | |
|---|---|---|---|
| 3,714,033 | 1/1973 | Somekh et al. | 208/321 |
| 3,721,620 | 3/1973 | Paret et al. | 208/317 |
| 3,985,812 | 10/1976 | Del Bel et al. | 568/750 |
| 4,001,341 | 1/1977 | Welch et al. | 260/621 B |
| 4,058,454 | 11/1977 | Asselin | 208/321 |
| 4,081,355 | 3/1978 | Preusser et al. | 208/313 |
| 4,153,670 | 5/1979 | Rennick | 423/189 |
| 4,154,673 | 5/1979 | Otani et al. | 210/30 R |
| 4,208,384 | 6/1980 | Mitchell | 423/220 |
| 4,334,983 | 6/1982 | Mentzer | 208/326 |
| 4,347,144 | 8/1982 | Bodenbenner et al. | 210/761 |
| 4,491,565 | 1/1985 | Verachtert | 422/256 |
| 4,767,543 | 8/1988 | Chornet et al. | 210/759 |
| 5,120,902 | 6/1992 | Tagamolila et al. | 585/836 |
| 5,232,604 | 8/1993 | Swallow et al. | 210/759 |
| 5,244,576 | 9/1993 | DeRoeck et al. | 210/638 |
| 5,268,104 | 12/1993 | Masoomain | 210/638 |
| 5,358,646 | 10/1994 | Gloyna et al. | 210/762 |
| 5,360,552 | 11/1994 | Yan | 210/762 |
| 5,368,726 | 11/1994 | Masoomain | 210/188 |
| 5,395,517 | 3/1995 | Varadi | 210/104 |
| 5,460,734 | 10/1995 | Birbara et al. | 210/763 |
| 5,505,856 | 4/1996 | Campen et al. | 210/668 |
| 5,552,063 | 9/1996 | Yan | 210/763 |

FOREIGN PATENT DOCUMENTS

| | | |
|---|---|---|
| 2185393 | 3/1997 | Canada. |
| 0509964A1 | 10/1992 | European Pat. Off. ........ C10G 19/08 |
| 2035324 | 2/1979 | Germany. |
| 247464 | 7/1987 | Germany. |

OTHER PUBLICATIONS

Perry et al, "Distillation", vol. IV, 1965 p. 5.
Kirk–Othmer, Encyclopedia of Chemical Technology, Third Edition, vol. 17, pp. 226, 544, and 545.
Chemical Engineers' Handbook, McGraw–Hill Book Company, Inc. 1950, John H. Perry, PH.D., Editor, Third Edition, p. 717.

Primary Examiner—Virginia Manoharan
Attorney, Agent, or Firm—Pravel, Hewitt & Kimball

[57] ABSTRACT

A process for pretreating a spent caustic stream prior to oxidation includes countercurrent multi-stage elevated temperature solvent extraction of dissolved organic material from the spent caustic using a solvent to yield a spent caustic raffinate containing only residual amounts of organic solute. The raffinate is steam distilled to remove the residual organic solutes, yielding a pretreated spent caustic stream substantially free of organic material. The pretreated spent caustic is suitable for use in a Kraft paper process or for oxidation prior to recycle or disposal. Solvent extract from the extractor is regenerated in a solvent regenerator having an overhead stream for purging light ends, a bottom stream for purging heavy ends, and a heart-cut side stream for recycling solvent to the extractor. Alternatively, solvent may be taken as a cut from an existing plant process stream, once passed through the multi-stage solvent extraction unit, and then returned to the processing unit of the plant from which it was taken.

14 Claims, 2 Drawing Sheets

SPENT CAUSTIC (PRE)TREATMENT PROCESS

BACKGROUND OF THE INVENTION

1. Field of the Invention

This invention relates to a method for treatment of a spent caustic stream and in particular to treatment of the spent caustic stream for removal of organic contaminants prior to its oxidation, disposal or reuse.

2. Description of the Related Art

In the petroleum and petrochemical industries it is common to scrub gas mixtures that contain acid gas components, such as carbon dioxide ($CO_2$) and hydrogen sulfide ($H_2S$), to remove these components from such gas mixtures before it is used for further processing purposes or otherwise disposed of as by venting to the atmosphere. An aqueous sodium hydroxide solution—i.e., a caustic solution—is commonly used for scrubbing of such gas mixtures. By reaction with the caustic solution, i.e. NaOH, acid gas components such as hydrogen sulfide and carbon dioxide are converted into sodium sulfide ($Na_2S$), sodium hydrosulfide (NaHS), sodium carbonate ($Na_2CO_3$) and sodium bicarbonate ($NaHCO_3$) which carry into the sodium hydroxide (NaOH) solution. Wherein the gas mixture to be scrubbed also contains hydrocarbon components (particularly $C_4$, $C_5$ and higher molecular weight hydrocarbon) a portion of these hydrocarbon components also pass as such into the aqueous sodium hydroxide stream, each to the limit of its mutual solubility in solution.

One type of petrochemical operation wherein an aqueous sodium hydroxide solution is almost invariably used for gas scrubbing is in an ethylene production unit. In an ethylene production unit a saturated aliphatic hydrocarbon feed, such as ethane, propane, or higher molecular weight hydrocarbon mixtures such as naphtha, atmospheric and/or vacuum gas oils, and the like, is heated at high temperatures in the presence of steam to crack the saturated hydrocarbon molecules down to lower molecular weight unsaturated hydrocarbons such as ethylene predominately, followed by propylene, and then various quantities of $C_4$, $C_5$ and $C_6$ mono- and diolefinic hydrocarbons, with a lesser quantity of $C_7$ and higher weight saturate and unsaturated aliphatic, alicyclic and aromatic hydrocarbon. During steam cracking any sulfur containing compounds present in the hydrocarbon feed stream are converted into hydrogen sulfide and/or organically bound sulfur compounds and also a content of carbon dioxide is generated by the water-gas shift reaction. The resultant gas mixture from steam cracking is then quenched to a lower temperature of from about 35° to 40° C. whereupon the major portion of its water and $C_7$-plus hydrocarbon content is condensed and separated from said gas mixture. After quenching, the remaining constituents of the gas mixture are conditioned by various steps of gas compression and refrigerative cooling to prepare it for cryogenic distillation whereby its ethylene, propylene and butenes contents will ultimately be recovered in essentially pure form for ultimate use as monomers in the production of various polymers, such as polyethylene, ethylene copolymers, polypropylene and the like.

One step required to properly condition the gas mixture prior to its cryogenic distillation is to scrub the cracked gas essentially free of any acid gas components, such as hydrogen sulfide and carbon dioxide. This is accomplished at some interstage location of a multi-stage gas compression system and, on occasion post-compression, wherein the cracked gas stream is at a pressure from about 10 to about 20 atmospheres (atm) by contacting the compressed gas stream with an aqueous sodium hydroxide solution by countercurrent contact in a gas-liquid contact vessel often referred to as an "absorber" or "scrubber."

The aqueous sodium hydroxide solution after such gas scrubbing contact is referred to as a "spent caustic solution" and contains, in addition to sodium hydroxide, the sodium sulfide, sodium hydrosulfide, sodium carbonate and sodium bicarbonate that results from the removal of acid gas compounds from the so scrubbed gas stream and also a significant content of dissolved mono- and di-olefinic hydrocarbons as well as carbonyls, styrenics and other organic contaminants. In this condition, the spent caustic solution presents various problems with respect to either its environmental disposal or to its reconditioning for subsequent uses. For example, polymers tend to form in the spent caustic solution as long as the solution contains dissolved polymer precursors at an elevated temperature. Aldol condensation of dissolved oxygenated hydrocarbons (carbonyls, such as aldehydes and ketones) produces polymeric products that are commonly referred to as a "red oil," which is and remains partially soluble in a spent caustic solution that issues from the caustic scrubbing tower. Certain highly unsaturated hydrocarbons in the cracked gas, such as acetylenes and dienes (diolefinic hydrocarbons), that pass into the spent caustic solution in the scrubbing tower may polymerize to various degrees, even to the point of a molecular weight which renders certain polymeric species insoluble in the spent caustic solution such that they precipitate out of solution and may be removed in a deoiling drum. In any event, the spent caustic solution removed from the gas scrubbing tower, even following a deoiling drum treatment, contains in dissolved form a content of such condensation and addition types of polymer and polymeric species which may later precipitate from the spent caustic solution as foulants on equipment surfaces when subsequently exposed to the spent caustic solution. From a disposal standpoint, sodium sulfide, sodium hydrosulfide contaminants as well as the dissolved hydrocarbon and other organic contaminants impart to the spent caustic solution too high a chemical oxygen demand (COD) and/or biological oxygen demand (BOD) to allow for its environmentally acceptable disposal. Further, the alkaline value of the spent caustic stream is not useable for other purposes due to the presence therein of these contaminant components. From either perspective, the constituents of the spent caustic solution that are other than sodium hydroxide and water are contaminants which either render it unusable or disposable absent any other further treatment.

Accordingly, spent caustic solutions are commonly subjected to some kind of oxidation process to oxidize its sulfide salts content to at least thiosulfates, and preferably to their highest oxidation state—sulfate compounds. Such oxidation processes include wet air oxidation (WAO) processes wherein an oxygen containing gas, such as air, dispersed in solution in the form of fine bubbles is contacted with spent caustic at an elevated temperature in a contacting column for a relatively long period of time. In this context, the dissolved hydrocarbon polymer and precursor polymeric contaminants in the spent caustic solution cause even yet other major problems, particularly when originating from an ethylene production unit. Specifically, equipment surfaces within a WAO process that are exposed to direct contact with a spent caustic solution undergoing WAO treatment, and other line transfer and valve surfaces exposed to said solution, over time tend to become clogged and fouled with polymeric material which necessitate periodic shutdown and cleanup of the WAO unit. Therefore, it is desirable to first free the spent caustic from dissolved polymers and polymer precursors if polymer formation and fouling of a WAO unit is to be avoided.

Proposals have been set forth in the art for methods of pretreating the spent caustic, prior to its oxidizing treatment, that are intended to reduce this fouling problem. For example, U.S. Pat. No. 5,268,104 proposes to contact at ambient temperature spent caustic with gasoline in a mixing drum and then separate the spent caustic from the gasoline in a deoiling drum, after which the spent caustic from which 70–100% of dispersed oil has been purported to be removed, is oxidized with an air/ozone mixture. Even so, in practice a spent caustic pretreated by this mixing drum-deoiling drum technique has still been found to present a fouling problem to the equipment surfaces of post-treatment units. U.S. Pat. No. 5,244,576 by DeRoeck et al. proposes a somewhat more elaborate method for contacting a spent caustic stream with a recirculating stream of pyrolysis gasoline in order to remove prepolymer and polymeric hydrocarbons from the spent caustic prior to its treatment in a WAO unit. DeRoeck Patent '576 proposes to reduce polymeric fouling of the operating surfaces of a wet air oxidizer ("WAO") unit by first intimately contacting the spent caustic solution for a prolonged contact time with a recirculating volume of a pyrolysis gasoline as solvent to remove polymerizable hydrocarbon, particularly partial polymers, from the spent caustic. As described, the solvent is recirculated to the contacting vessel containing spent caustic at a rate of from 0.5 up to 10 times the volume rate of spent caustic under conditions that provide for a contact residence time of 10 to 20 minutes. Further, as the solvent is recirculated there is continuously both removed a take-off cut of solvent for solvent recovery and added a makeup quantity of fresh solvent, both in similar volumes, such that the volume ratio of fresh make-up solvent to spent caustic is about 1 to 100. Intimate contact of solvent with spent caustic is accomplished by the agitation created by the forced recycle of solvent using jet mixers or spray nozzles or by a mechanical stir. The vessel for contact may be subdivided, or a series of contact vessels may be utilized, to provide for multiple mixing stages or even a series of static mixers.

Even though the procedure described by DeRoeck '576 is the state of the art pretreatment for spent caustic, and achieves a significantly better removal of prepolymer and polymer organics from a spent caustic than does a simple mixing drum-deoiling drum treatment as described in U.S. Pat. No. 5,268,104; and therefore the DeRoeck '576 procedures extends the operating time before polymer fouling shutdown-cleanup is needed by a subsequent WAO unit; it has been found in practice that polymer fouling still presents a substantial problem with a spent caustic pretreated by the DeRoeck '576 procedure.

There is needed a still better, more efficient method for the treatment of a spent caustic stream to eliminate from it those contaminants which are objectionable from a standpoint of either its proper disposal or subsequent treatment to further condition the spent caustic for reuse, other uses or to render it safely disposable.

SUMMARY OF THE INVENTION

The present invention provides a process for removing substantially all organic material from a spent caustic stream. That is, treatment of a spent caustic in accordance with the method of this invention will reduce its content of organic contaminants to a level less than 50 ppm. Moreover, the two primary functional groups of contaminants being (1) conjugated dienes (e.g., R—C=C—C=C—R) and (2) carbonyls (e.g., R—CH=0) may be reduced by this invention to concentrations approaching less than 10 ppm and nil, respectively.

In treating a spent caustic solution having a quantity of organic material dissolved in it, a wholly fresh or virgin water-immiscible organic solvent is intimately mixed by countercurrent flow with the spent caustic solution in a multi-stage liquid-liquid extractor wherein both fluids during their contact are at a temperature above ambient but preferably below 100° C. In this highly efficient extraction unit, diolefin hydrocarbon (dienes) contaminants are removed from the spent caustic to a level of 20 ppm or less. There is, however, a finite solubility of the organic solvent in the spent caustic solution. To remove this content of residual organic material from the extracted spent caustic, the spent caustic as raffinate from the solvent extractor, hereinafter referred to as "spent caustic raffinate", is subjected to steam distillation. The spent caustic raffinate enters the top of a steam distillation tower. The raffinate flows downward through the tower into a kettle-type reboiler, which produces steam in-situ by way of the contained water content of the caustic raffinate. The steam flows upward in the tower, and by altering the partial vapor pressure of the residual organics in the spent caustic raffinate, the steam removes residual organic material from the spent caustic raffinate stream. A pretreated spent caustic stream is thus provided that is substantially free of organic material and contaminants including any and virtually all monomeric polymer precursors. The pretreated spent caustic stream can be suitably disposed of in an environmentally acceptable manner such as by oxidation of sulfur compounds and disposal as a waste stream or, preferably, by sale for its alkali salt content for use in various industries such as pulp and paper (Kraft Recovery Process), heavy metal leaching for catalyst production, etc.

The organic solvent employed in the counter-current, multistage contact extraction of the spent caustic is a "virgin" solvent in the entirety of its volume used. That is, with respect to any volume of solvent which first comes into contact with a volume of spent caustic, no portion of this solvent volume has previously been in contact with a prior portion of spent caustic without also having first been completely regenerated to its virgin state by distillation. In other words, each volume of organic solvent supplied to the extraction column is either passed through one time only or, if reused, is first completely regenerated to the absorption capacity of a virgin organic solvent. This condition is essential to achieving an essentially nil level of dissolved $C_{4-5}$ diolefins—i.e., less than 20 ppm total dienes—in the spent caustic raffinate. Another necessary condition to achieve this essentially nil level of dissolved diolefins is that the solvent and spent caustic must be brought into countercurrent contact while each is at an elevated temperature, that is a temperature significantly greater than 25° C. and up to 100° C., preferably while each is at an initial column input temperature of from 35° C. to about 100° C.

It has been found that the counter-current flow contact of a spent caustic stream with a water immiscible solvent of a lower density under agitation and in multiple contact stages while both fluids are at greater than ambient temperature substantially removes from the spent caustic solution $C_4$ and $C_5$ diolefinic and olefinic constituents which processes heretofore either did not contemplate to exist and certainly did not to any substantial extent remove from a spent caustic stream. This substantial removal of $C_4$ and $C_5$ diolefin and olefin constituents occurs concomitantly with the removal of other troublesome contaminants, such as carbonyls (i.e. R—COH) and prepolymer and polymeric constituents, from the spent caustic solution.

Since a preferred extraction solvent is one rich in aromatics such as benzene, toluene and/or xylenes, to the extent that the spent caustic solution contains like aromatic constituents as contaminants, these will not be removed by the solvent extraction, and may even be somewhat enriched in the spent caustic raffinate. However, given that the spent caustic raffinate is now of a low and/or essentially nil content of $C_4$ and $C_5$ diolefin, said raffinate may be subjected to steam stripping distillation without concern for fouling the steam stripper operating surfaces with polymeric materials. The spent caustic raffinate may be steam stripped at subatmospheric, near atmospheric or superatmospheric pressure at bottom column reboil temperatures of from about 110° to about 130° C. or greater to remove residual aromatic constituents and further reduce the already low level of residual diolefins, all of which exit in the vapor overhead product of the steam stripping column.

The steam distilled caustic raffinate taken as a bottom product from the steam stripping column, hereinafter referred to as the "treated" or "pretreated" caustic stream, will contain a total quantity of organic constituents which is on the order of less than 50 ppm and a quantity of dienes of 20 ppm or less, generally less than about 10 ppm. To the extent that the organic content of the spent caustic solution constituted an obstacle to its disposal (BOD level) or its further treatment to condition it for reuse, a new use or disposal, the resultant treated or pretreated caustic stream that results as a product of the process of this invention is free of such objections.

BRIEF DESCRIPTION OF THE DRAWING

A better understanding of the present invention can be obtained when the following detailed description is considered in conjunction with the figures.

DETAILED DESCRIPTION OF THE PREFERRED EMBODIMENT

Figure 1:
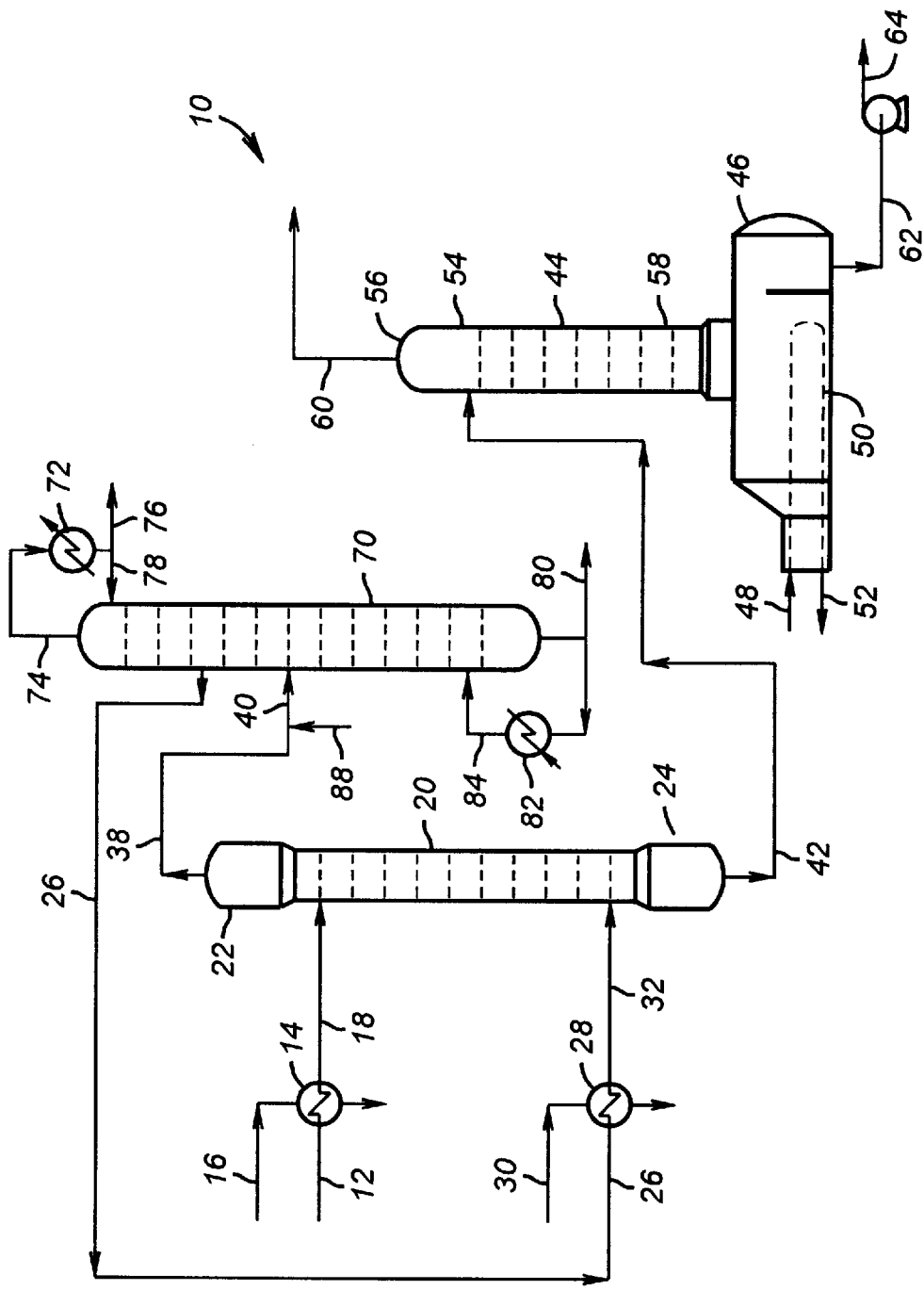
FIG. 1 is a schematic illustration of a spent caustic pretreatment process according to the present invention wherein the extraction solvent is recovered, regenerated to a virgin state and recycled to the extraction tower, with provision for addition of solvent make-up as necessary

The present invention is directed to the treatment of spent caustic from any process generating a spent caustic stream containing hydrocarbons or other organic material. Caustic soda, namely sodium hydroxide, in the form of a aqueous sodium hydroxide (caustic) solution is used to react and thereby remove acid gases such as carbon dioxide, hydrogen sulfide, mercaptans, carbon disulfide and other sulfur-containing compounds from various process streams in the petroleum, petrochemical and metals industries. For example, in an ethylene production unit, sulfur compounds are removed from cracked gas streams by absorption using an aqueous caustic stream (i.e., a solution of typically about 10 wt % sodium hydroxide). After absorption, the aqueous caustic stream is referred to as a spent caustic stream, and this spent caustic stream has typically required treatment to render its disposal in an environmentally acceptable manner.

Spent caustic generated in ethylene plants can be reused in pulp and paper mills as make-up alkali in a Kraft Recovery System and other processes, but hydrocarbons and other organic compounds (referred to herein as "organics") must first be removed. Alternatively, spent caustic can be oxidized and neutralized for disposal as a waste stream. In either case it is desirable to remove as completely as possible any organics contained in the spent caustic stream. The present invention provides a process for removing organics from a spent caustic stream to a negligible level. Where there is a market for spent caustic as a makeup alkali to a Kraft Recovery System in a pulp and paper mill, the removal of hydrocarbons, particularly aromatic hydrocarbons, and organic material can transform what would otherwise be a waste stream into a marketable product. Where spent caustic is oxidized for disposal as a waste, removal of organics improves oxidation efficiency because these materials include polymers and polymer precursors, such as monomers, which foul downstream equipment causing severe problems such as reduced heat exchange efficiency and equipment plugging.

The method of this invention comprises as a first general step, the counter-current flow of a spent caustic in multiple contact stages at an elevated temperature with an immiscible organic solvent to yield a (caustic) raffinate having an essentially negligible content of $C_4$ and $C_5$ diolefins, and as a second general step, the steam distillation of the caustic raffinate to remove from it essentially all aromatic constituent contaminants with a further reduction in the level of any residual organics and $C_4$ and $C_5$ diolefins to yield as a treated caustic stream one of an essentially negligible total organic content; that being, less than 50 ppm total organics and a diene content of or less than 20 ppm total organics and generally less than 10 ppm of diene content with essentially nil carbonyls.

The solvent for the first step extraction of spent caustic is preferably an organic liquid, particularly a hydrocarbon liquid, that is a readily available stream within the battery limits of the plant which produces a spent caustic stream. Further, the preferred solvents for use are those of a high content of aromatics, particularly toluene. Aromatics, or hydrocarbon streams rich in aromatic content, have been found to have a good selectivity for extracting organic solutes, particularly $C_{4-5}$ diolefin hydrocarbon solutes, from a spent caustic while also having a relatively small density difference and interfacial tension relative to spent caustic. Such solvent characteristics provide for favorable distribution coefficients within and a minimum of shear thinning between the solvent and spent caustic in counter-current flow liquid-liquid extraction.

Figure 2:
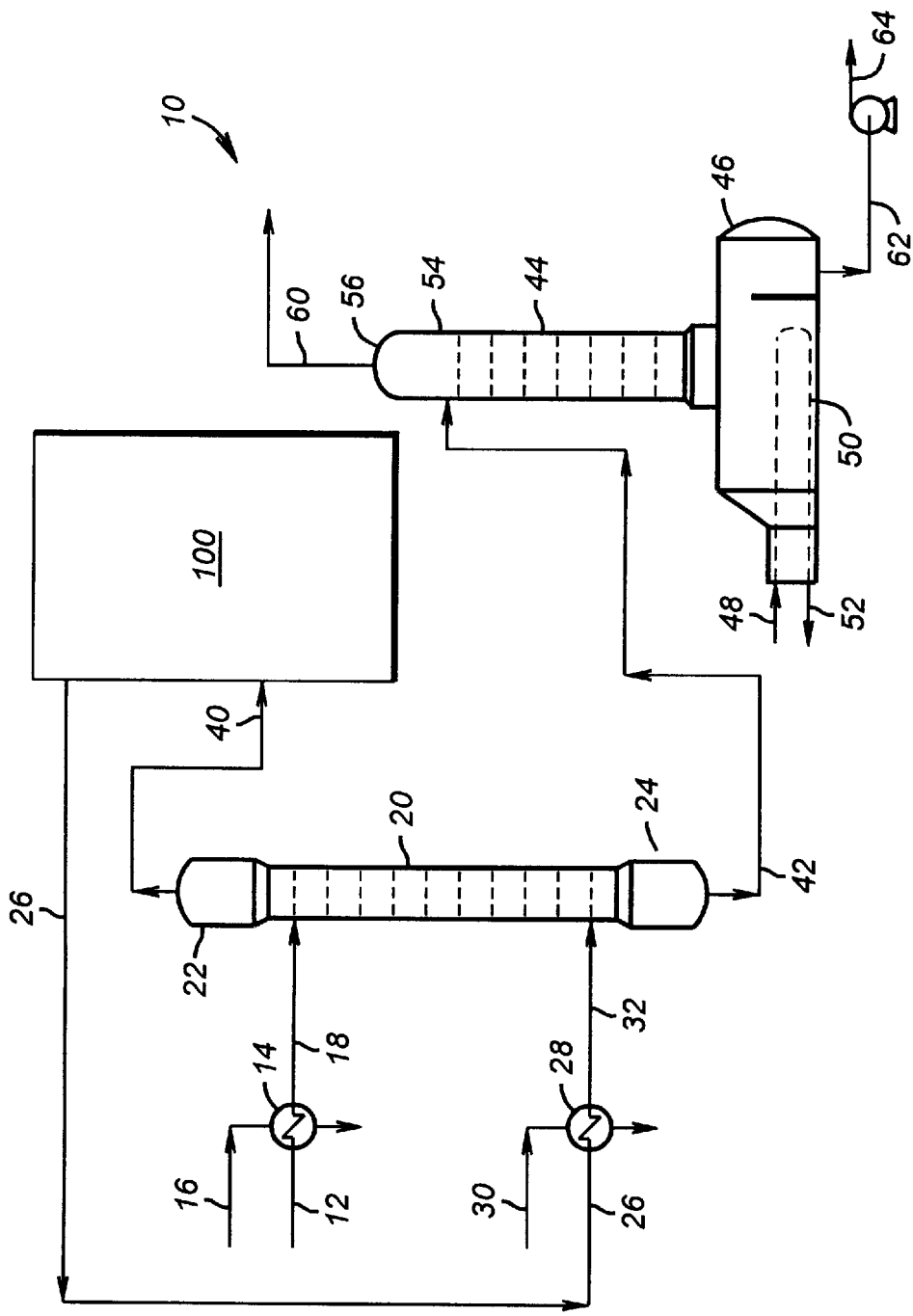
FIG. 2 is a schematic illustration of a spent caustic pretreatment process wherein the extraction solvent is taken as a cut of a hydrocarbon stream otherwise available within the battery limits of a plant, is passed once through the extraction tower and thereafter this spent solvent is returned to the processing unit of the plant from which it was first taken.

Within the battery limits of a refinery operation, a toluene stream as such may be readily available for use, and when so this toluene stream would be the preferred source for the solvent. In this context, such portion of that toluene stream as is used for solvent purposes may be used on a single pass basis and upon its recovery from the extractor column of this process this quantity of now spent toluene or extract may be returned as feed to the toluene distillation column of the refinery—as generally illustrated by FIG. 2. In other situations, such as an ethylene production unit wherein a toluene stream as such is not typically available, one may import a stock of toluene and operate the extraction step with a toluene solvent regeneration and recycle loop as generally illustrated in FIG. 1. Alternatively, in an ethylene production unit there is typically available as a process stream a stabilized hydrogenated pyrolysis gasoline stream, and such a stream is rich is aromatic constituents—namely, benzene, toluene, mixed xylenes and others. This hydrogenated pyrolysis gasoline stream may be used as a source for the extraction solvent on a single pass basis and then the spent gasoline solvent returned to the production still for pyrolysis gasoline within battery limits of the ethylene production unit—again, as generally illustrated by FIG. 2—or with a solvent regeneration and recycle loop as generally illustrated in FIG. 1.

As before noted, to achieve in a caustic raffinate stream an essentially negligible content of $C_{4-5}$ diolefins, it is critical to co-mingle a virgin extraction solvent into counter-current flow contact with spent caustic through multiples contact stages while both fluids are at a greater than ambient temperature. The multi-stage countercurrent liquid-liquid extraction of the spent caustic may be performed in a variety of equipment designs. A multi-stage rotary bucket extractor (known as a Graesser extractor), wherein a horizontal drum is filled with stratified settling liquids and a series of buckets revolving around the inner periphery pick up the liquids and releases them as rain droplets of one liquid through the other, may be employed. Likewise, agitated liquid-liquid column contactors, such as a Scheibel baffle column, a Kuhni column, a Rotating Disc contactor, an Oldshue-Rushton column or a Karr reciprocating plate contactor, may be employed.

Unless overhead space is limited within the unit perimeter, a vertical agitated liquid-liquid column contactor is preferred. Preferably, a vertical contacting tower is employed wherein a spent caustic stream of somewhat elevated temperature is fed to the tower proximate to its upper end while the immiscible solvent at an elevated temperature is fed to the tower proximate to its lower end. The heat content provided by the spent caustic stream and the virgin extraction solvent stream feeds to the extraction column is such that, preferably the temperature of both liquids during contact within the tower will be at least 50° C., and more preferably 70° C. or greater. Preferably, this will be accomplished by maximizing such heat content as much possible through the temperature at which virgin extraction solvent is feed to the extraction column, whilst minimizing the balance of the required heat content supplied by the temperature of the spent caustic stream fed to the top of the extraction tower. This means that it is preferred to operate in a feed mode to the extraction tower wherein the highest temperature of solvent feed is as practical is used to enable the lowest temperature as is practical for that of the spent caustic stream feed consistent with an extraction column operation temperature of 50° C. or greater, and more preferably of 70° C. or greater. Internal of the contact tower there should be plates or trays that are preferably perforated and most preferably these perforated trays/plates are mechanically affixed to means by which they can be reciprocated, rotated or otherwise moved within the tower by a motive means.

By reason of its greater density, the spent caustic fed to the top of the extraction tower will move toward the tower bottom while the bottom feed solvent is displaced toward the upper portion of the extraction tower. During this transposition of the immiscible liquids, they are brought into intimate contact by both the agitation of their movement around, about, and through the perforations of column trays/plates and also by the frequency of the reciprocation, rotated or movement of these perforated trays/plates within the extractor column itself.

The intimacy of spent caustic-solvent contact caused by this counter-current agitated flow mixing, together with the maintenance of a gradient difference in solute concentration between spent caustic and solvent—as between the top column solute full spent caustic-top column solute rich solvent versus bottom column solute lean caustic-bottom column virgin solvent—which is caused by the counter-current nature of the fluid flows enables the maximum possible extraction of $C_{4-5}$ diolefins and other non-aromatic organic solutes from the spent caustic into the immiscible extraction solvent for the given temperature chosen for operation of the column.

As also previously noted, the temperature at which this intimate contact between spent caustic and immiscible extraction solvent is secured also critically bears on the degree of solute extraction achieved and hence the quantity of residual organics, particularly $C_{4-5}$ diolefins, that will be left remaining in the caustic raffinate, and hence the final treated caustic stream. Ambient temperature caustic-solvent contacting, however intimate, an insufficient condition to either achieve a relatively negligible content of diolefins in the caustic raffinate or sufficient removal of polymer procursors other than dienes in the final treated caustic stream. Instead, it has been found that both contacting fluids must be at the time of their contact at least 10° C. above ambient (i.e. 25° C. is ambient), and preferably 25° C. above ambient; namely, the temperature of the fluids during contact within the extraction tower should not be less than 35° C., and preferably not less than 50° C. and most preferably in the range of 70° to 90° C. The maximum temperature which either feed stream may be heated should not exceed the boiling point of that feed stream composition at the pressure at which the extraction column is operated.

Also, the rates of feed to the extraction column; as this bears upon the residence time of contact within the column and ratio of solvent to spent caustic feeds; bears upon the ultimate efficiency of the extraction of $C_{4-5}$ diolefins from the spent caustic. Generally, it is desirable that the volume ratio of solvent to spent caustic feed be at least 1:1, more preferably 1.5:1 to about 2:1; and a 2:1 feed ratio is preferred to achieve an assured diene extraction.

As a bottom product take-off, the extraction column yields a caustic raffinate which contains a quantity of $C_{4-5}$ diolefins of less than 30 ppm and preferably less than 15 ppm. This compares to a typical content in a spent caustic from an ethylene production unit for such $C_{4-5}$ diolefin constituents of from about 1000 ppm to about 1500 ppm. With such negligible quantities of highly reactive $C_{4-5}$ diolefins, together with the elimination from the caustic raffinate of free polymers and polymer precursors, the caustic raffinate may be steam distilled without concern for fouling the steam distillation unit with oligimers.

Since the extraction solvent, particularly if one of high aromaticity, may not extract aromatic constituents from the spent caustic and instead may actually add aromatic constituents to that spent caustic that becomes the caustic raffinate stream; to reduce the level of aromatic constituents in the caustic raffinate it is necessary to steam distill the caustic raffinate.

Turning now to FIG. 1, a spent caustic pretreatment process 10 with a solvent regeneration and recycle loop is illustrated schematically. In an ethylene plant, for example, an aqueous caustic stream is used to scrub acid gases containing sulfur compounds from a hydrocarbon stream. After gas scrubbing, in addition to containing inorganic alkali salts, the caustic stream, now a spent caustic stream, also contains organic compounds such as light and heavy hydrocarbons, polymers and polymer precursors. Before the spent caustic stream is sold, disposed of or reused, it is preferable to remove the organic compounds. The present invention essentially directs the complete removal of these organic compounds. A feed spent caustic stream 12 containing these organic compounds is fed to spent caustic pretreatment process 10. Feed spent caustic stream 12 is preheated to an appropriate temperature in a heat exchanger 14 by steam 16 or equivalent heat transfer fluid to produce a heated feed spent caustic stream 18, which is fed into an extractor 20.

Extractor 20 is a multi-stage countercurrent agitated plate-type liquid-liquid extraction column. Extractor 20 has an upper end 22 and a lower end 24, and spent caustic stream 18 is introduced proximate to upper end 22. Spent caustic stream 18 flows downward through extractor 20 and exits extractor 20 as raffinate 42.

A feed solvent stream 26 is preheated to an appropriate temperature in a heat exchanger 28 by steam 30 or equivalent heat transfer fluid to produce a heated feed solvent stream 32. Heated feed solvent stream 32 is fed to extractor 20 near lower end 24 for flow upward in extractor 20 and exits extractor 20 as extract 38. Spent caustic 18 has a higher density than feed solvent 32, so spent caustic 18 flows downward through extractor 20 while solvent 32 is displaced upward through extractor 20. Internal components in extractor 20 provide intimate mixing as assisted by a reciprocated, rotated or other movement of these internal components, between the feed spent caustic stream 18 and the feed solvent stream 32 during the juxtaposition of these feed streams through the column. In upper end 22 solvent 32 separates from spent caustic 18 and flows overhead as a solvent extract stream 38. At lower end 24 spent caustic 18 separates from feed solvent 32 and flows out of lower end 24 as a spent caustic raffinate stream 42.

Feed spent caustic stream 12 from the ethylene plant (not shown) contains primarily sodium carbonate, sodium hydrosulfide and sodium sulfide in water but is also contaminated with light hydrocarbons, polymers, polymer precursors and heavy hydrocarbons. Feed solvent 26 is selected to provide sufficient solubility for these organic compounds so that extractor 20 removes essentially all of diolefinic contaminants and prepolymer, polymeric and aliphatic hydrocarbon constituents from feed spent caustic stream 18 to produce spent caustic raffinate stream 42 of an essentially negligible diene content. While feed spent caustic stream 12 may contain up to 1000 or greater parts per million (ppm) polymerizable organics precursors, spent caustic raffinate stream 42 has only a residual amount of these organic precursors, less than 30 and typically less than 10 parts per million (ppm). Because these organic precursors are much more soluble in organic feed solvent stream 32 than in aqueous feed spent caustic stream 18, the organic precursors diffuse under elevated temperature into the solvent to produce solvent extract stream 38. Thus, extractor 20 provides a mass transfer operation for removing organic contaminants from feed spent caustic stream 18.

Extractor 20 and feed solvent 32 are sized to provide sufficient absorption capacity so that spent caustic raffinate stream 42 contains only a minimal residual amount of polymerized or polymerizable organic material. One skilled in this art upon consideration of the quantity of spent caustic and the amount of organic material particularly contained therein may determine the amount of solvent required, as well as the size and number of theoretical mixing stages required for extractor 20 to produce a spent caustic raffinate stream 42 essentially free of diene and other organic polymer precursors. By feeding the solvent into extractor 20 near the outlet for the spent caustic raffinate stream 42, the concentration gradient between organic solutes in the spent caustic and in the solvent is maximized along the lines of flow of the immiscible liquids within extractor 20. This provides the greatest driving force for the organic solutes to diffuse from the spent caustic into the solvent.

Although removal efficiency of organic polymer precursor solutes in extractor 20 is high, spent caustic raffinate stream 42 nevertheless becomes saturated with non polymerizable hydrocarbon components from the extraction solvent. To further reduce the quantity of organic solutes or dissolved hydrocarbon and organic material, spent caustic raffinate stream 42 is steam-distilled in a steam distillation unit 44 to remove the organic solutes.

Steam distillation unit 44 has a kettle-type reboiler 46 which is heated by steam 48 or equivalent heat transfer fluid in a tube bundle 50 producing a condensate 52. Steam distillation unit 44 has a steam distillation tower 54 which has an upper end 56 and a lower end 58 attached to reboiler 46. Spent caustic raffinate stream 42 is fed to steam distillation tower 54 proximate to upper end 56, the aqueous caustic flowing downward while the organic solutes are vaporized by steam flowing upward. The organic solutes are removed from the spent caustic according to fundamental distillation principles and flow upward in tower 54. Heat provided by steam 48 boils the water in spent caustic raffinate stream 42 providing water vapor in steam distillation tower 54 for altering the partial vapor pressure of the organic solutes in the vapor phase and carrying the organics upward, thus allowing a hydrocarbon purge 60 to be discharged from upper end 56 of steam distillation tower 54. A pretreated spent caustic stream 62 is withdrawn from reboiler 46 by a pump for further routing by line 64. Pretreated spent caustic stream 64 has a negligible amount of organic solutes in it, typically less than 40 ppm. Pretreated spent caustic stream 64 typically contains less than 10 ppm of polymerizable organic solutes.

FIG. 1 which illustrates a loop for spent solvent regeneration to a virgin solvent state for recycle use, solvent extract stream 38 together with fresh solvent (make-up) stream 88 are combined and routed by line 40 to a solvent regenerator 70. Solvent regenerator 70 is a conventional trayed distillation tower having a partial condenser 72 on an overhead stream 74. A light ends stream 76 is purged from solvent regenerator 70, and a reflux 78 is returned to the column. A heavy ends stream 80 is purged from solvent regenerator 70 for removing heavy organic material, such as polymeric material, from solvent extract stream 40. A reboiler 82 provides heat input to solvent regenerator 70, returning a reboiler stream 84 to the column. A solvent recycle stream 26 is taken as a heart-cut liquid side stream from solvent regenerator 70. Fresh solvent make-up stream 88, to maintain a constant solvent volume balance, may be added to recycle stream 26 but is preferably added to the solvent extract stream 38 that is fed by line 40 to solvent regenerator 70. In this way, any heavy weight tails that may exist in the portion of fresh make-up solvent 88 will pass to and out with the heavy ends stream 80.

Spent caustic (pre)treatment process 10 is particularly useful for the removal of dissolved hydrocarbons and heat-sensitive polymer precursors such as may be found in a spent caustic stream from an ethylene or refinery production unit. While a conventional spent caustic treatment system may include simple deoiling of the spent caustic to remove hydrocarbons, polymers and polymer precursors and/or steam stripping operated at near atmospheric pressure to remove light organics from the spent caustic, spent caustic (pre)treatment process 10 provides more complete removal of the organic material found in the spent caustic stream.

FIG. 2 illustrates a spent caustic (pre)treatment process 10 wherein the extraction solvent 26 is taken as an available hydrocarbon stream from an existing process stream within the battery limits of a plant 100 and is utilized on a one-pass basis through extractor 20 and recovered as a solvent extract stream 40 which is then returned as feed stock to the unit of plant 100 which generated the hydrocarbon stream which was drawn upon as the solvent source. Otherwise, operations of the extractor 20 to produce caustic raffinate 42 which is then distilled in steam distillation unit 44 to produce pretreated spent caustic 64 is like that discussed with respect to FIG. 1 wherein like items of equipment and their operations are similarly numbered for purposes of reference. Again with reference to FIG. 2, wherein plant 100 has a WAO unit, pretreated caustic stream 64 may be routed to the WAO unit as feed and there oxidized to the extent desired without posing any problems of fouling to the WAO unit.

In a conventional spent caustic treatment system, most of the polymer precursors are left in the spent caustic causing severe fouling of the stripper reboiler (or equivalent) resulting in frequent unit shutdowns for reboiler and stripper column cleaning or in the absence of a steam stripper, fouling of the WAO unit results with a need for shut down and clean up. Spent caustic treatment process 10 on the other hand removes heavy organics and polymer precursors by purging these organics through heavy ends stream 80 from solvent regenerator 70 as in FIG. 1, or passing these organics in the solvent extract stream 40 returned to the plant 100 as in FIG. 2. Ergo, fouling in the stripper reboiler (or equivalent) is avoided resulting in fewer unit shutdowns for reboiler and stripper column cleaning.

The present invention uses an extraction solvent that is volatile and readily removable from the spent caustic by steam distillation. The extraction solvent is preferably available as a byproduct stream from within the process generating the spent caustic stream. For example, the solvent may be a (stabilized) hydrogenerated pyrolysis gasoline produced in an ethylene plant. The extraction process results in the saturation of the spent caustic with the solvent. Steam distillation is used to remove the solvent from the spent caustic. Dissolved heavy organics, polymeric material, polymer precursors and monomers are almost completely removed from the spent caustic by the extraction step performed in extractor 20. Organic solutes in the spent caustic raffinate are essentially completely removed in the steam distillation step. Because of the absence of polymeric material and polymerizable monomers in the reboiler that causes fouling, steam distillation can be carried out which results in essentially complete removal of the organics from the spent caustic.

The illustrative Examples which follow demonstrate the method of this invention and its comparison to prior practices of spent caustic treatment. Example 1 is a reference example which illustrate the effect upon diene extraction of ambient temperature contact of a spent caustic solution with hydrogenated gasoline as an extraction solvent. Examples 2 and 3 illustrated a practice of this invention of elevated temperature contact of the same spent caustic and hydrogenated gasoline extraction solvent with respect particularly to diene extraction. Examples 4–6 illustrate a practice of this invention of elevated temperature multiple contacts of a spent caustic and toluene as an extraction solvent with respect to diene extraction to provide a spent caustic raffinate that may then readily be steam distilled without concern for polymer fouling of the distillation unit.

EXAMPLE 1

A spent caustic solution obtained as a blowdown sample from a commercially operated caustic scrubber tower from an ethylene production unit was utilized in extraction shake test by contacting it with a solvent composition comprising 56 wt % benzene, 17 wt % toluene, 18 wt % other aromatics and with a balance of normal paraffins. The spent caustic solution analyzed to have 384 ppm diene content and was of a density of 1.173 g/cc. Density of the extraction solvent was 0.861 g/cc.

In a successive mix shake contact at 27° C. of 2:1 solvent-spent caustic (volume basis) at 120 sec shake test followed by 120 sec of settling time, the following results were observed:

|  | Diene Content ppm | % Initial Diene Content |
|---|---|---|
| Precontacted spent caustic | 384 | 100 |
| Raffinate-1 | 289 | 75 |
| Raffinate-2 | 273 | 71 |
| Raffinate-3 | 238 | 62 |

EXAMPLE 2

The procedure of Example No. 1 was repeated except in this case the temperature of both fluids at the time of contact shake test was 40° C.

|  | Diene Content ppm | % Initial Diene Content |
|---|---|---|
| Precontacted spent caustic | 384 | 100 |
| Raffinate-1 | 308 | 80 |
| Raffinate-2 | 215 | 56 |
| Raffinate-3 | 176 | 46 |
| Raffinate-4 | 124 | 32 |
| Raffinate-5 | 114 | 30 |
| Raffinate-6 | 113 | 29 |

EXAMPLE 3

The procedure of Example 1 was repeated except in this case the temperature of both fluids at the time of contact shake test was 70° C.

|  | Diene Content ppm | % Initial Diene Content |
|---|---|---|
| Precontacted spent caustic | 384 | 100 |
| Raffinate-1 | 95 | 25 |
| Raffinate-2 | 85 | 22 |
| Raffinate-3 | 56 | 15 |
| Raffinate-4 | 42 | 11 |
| Raffinate-5 | 34 | 9 |
| Raffinate-6 | 14 | 3.6 |

EXAMPLE 4

A spent caustic solution obtained as a red oil feed from a commercial facility was utilized in extraction shake test with toluene as a solvent. The spent caustic solution had a diene content of 574 ppm and was of a density of 1.01 g/cc. Both fluids were at 80° C. at the time of contact. The table below tabulates the quantity of initial diene content in the caustic as a result of each contact step.

|  | Diene Content ppm | % Initial Diene Content |
|---|---|---|
| Precontacted spent caustic | 574 | 100 |
| Raffinate-1 | 145 | 25 |
| Raffinate-2 | 133 | 23 |
| Raffinate-3 | 78 | 14 |
| Raffinate-4 | 30 | 5.2 |
| Raffinate-5 | 10 | 1.7 |

EXAMPLE 5

The spent caustic solution of Example 4 was subject to a continuous pilot plant extraction test with a 3" dia.×54 stage Scheibel Column with a 2:1 feed of toluene to spent caustic feeds at temperature of 70°–80° C. and column agitation speeds of 300 or 400 rpm. In the caustic raffinate from the column diene content was reduced to 30 ppm.

EXAMPLE 6

Caustic raffinate as produced by the procedure of Example 5 was steam stripped with a 3" diameter column containing 24 cartridge sieve trays. The caustic raffinate column feed contained 30 ppm diene content and 280 ppm toluene content. A superheated steam to caustic raffinate feed mass ratio of 0.26 was employed. The treated caustic column bottom take-off stream contained less than 5 ppm diene content and less than 5 ppm toluene content. Inspection of the column trays following relatively long-term distillation revealed no indication of any polymer build-up.

Although the invention has been described by reference to its preferred embodiments, those of ordinary skill in the art upon reading this description may appreciate changes and modifications that may be made which do not depart from the scope and spirit of the invention as described above or claimed hereinafter.

What is claimed is:

1. A process for pretreating a spent caustic stream, comprising:
    (a) feeding the spent caustic stream to a multi-stage countercurrent liquid-liquid extractor, the extractor having an upper end and a lower end, the spent caustic being introduced proximate to the upper end;
    (b) feeding a solvent stream to the lower end of the extractor;
    (c) withdrawing a spent caustic raffinate stream from the lower end of the extractor;
    (d) distilling the spent caustic raffinate stream in a steam distillation unit to provide a pretreated spent caustic stream.

2. The process of claim 1, further comprising withdrawing a spent solvent extract stream from the upper end of the extractor and regenerating the solvent extract stream in a solvent regenerator, the solvent regenerator being a distillation tower, the solvent extract stream being fed to the solvent regenerator, wherein a light overhead stream is purged, a heavy bottom stream is purged, and a heart-cut side stream is recycled into the solvent stream fed to the extractor.

3. The process of claim 2, further comprising adding a fresh solvent make-up stream to the solvent stream for offsetting solvent losses.

4. The process of claim 1, wherein the steam distillation unit includes:
    a reboiler for heating the spent caustic raffinate stream to produce steam; and
    and a distillation tower in fluid communication with the reboiler, the tower receiving the spent caustic raffinate stream at an upper end.

5. The process of claim 1, wherein the liquid-liquid extractor comprises a multi-stage countercurrent plate contactor.

6. The process of claim 1, wherein the spent caustic raffinate stream contains less than 20 parts per million dissolved organics.

7. The process of claim 1, including heating the spent caustic stream before feeding it to the extractor to a temperature of 40° to 100° C.

8. The process of claim 1, including heating the solvent stream before feeding it to the extractor to a temperature of 40° to 100° C.

9. The process of claim 1, including purging organic material from the spent caustic raffinate stream as an overhead stream from a steam distillation tower.

10. The process of claim 9, including regenerating the solvent extract stream in a solvent regenerator to produce a solvent recycle stream.

11. The process of claim 1, wherein said solvent is an organic stream of greater that 50 weight percent aromatic hydrocarbon content.

12. The process of claim 11, wherein said aromatic hydrocarbon solvent comprises benzene, toluene or xylenes.

13. The process of claim 1, wherein said solvent is 95% or greater toluene.

14. The process of claim 1, wherein said solvent is 95% or greater benzene.

* * * * *